(12) United States Patent
Pfaff et al.

(10) Patent No.: US 10,005,185 B2
(45) Date of Patent: Jun. 26, 2018

(54) FLEXIBLE CYCLE TIME-OPTIMIZED SHARING OF A WORKING SPACE FOR ROBOTS

(71) Applicant: KUKA Roboter GmbH, Augsburg (DE)

(72) Inventors: Bettina Pfaff, Augsburg (DE); Thomas Neff, Augsburg (DE); Marcus Hansen, Neu-Anspach (DE); Michael Wolf, Augsburg (DE); Christian Fremuth-Paeger, Augsburg (DE); Thomas Heinrich, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 189 days.

(21) Appl. No.: 14/933,168

(22) Filed: Nov. 5, 2015

(65) Prior Publication Data

US 2016/0129596 A1    May 12, 2016

(30) Foreign Application Priority Data

Nov. 10, 2014 (DE) .................... 10 2014 222 857 U

(51) Int. Cl.
*B25J 9/16* (2006.01)
*B25J 9/00* (2006.01)

(52) U.S. Cl.
CPC .......... *B25J 9/1682* (2013.01); *B25J 9/0087* (2013.01); *B25J 9/1676* (2013.01); *G05B 2219/39083* (2013.01); *G05B 2219/39091* (2013.01); *G05B 2219/39098* (2013.01); *G05B 2219/40475* (2013.01); *Y10S 901/08* (2013.01)

(58) Field of Classification Search
CPC ...... B25J 9/0087; B25J 9/1676; B25J 9/1682; G05B 2219/39083; G05B 2219/39091; G05B 2219/39098; G05B 2219/40475; Y10S 901/09
See application file for complete search history.

(56) References Cited

U.S. PATENT DOCUMENTS

| 4,644,237 A | 2/1987 | Frushour et al. |
| 5,561,742 A | 10/1996 | Terada et al. |
| 7,765,031 B2 | 7/2010 | Nagamatsu |

(Continued)

FOREIGN PATENT DOCUMENTS

| CN | 102905859 A | 1/2013 |
| DE | 19625637 | 1/1998 |

(Continued)

OTHER PUBLICATIONS

The English translation of the Chinese Office Action, dated Mar. 29, 2017, in the related Chinese Patent Appl. No. 2015107606500.

(Continued)

*Primary Examiner* — Khoi H Tran
*Assistant Examiner* — Robert T Nguyen

(57) ABSTRACT

The invention relates to a method and a system for controlling a robot, which non-simultaneously shares a working space with another robot. On the basis of a determined residual period, in which the working space remains occupied, the path planning of a robot is adjusted in a cycle time-optimized manner, in order to avoid a deceleration at the working space limit and a wait for the working space to be vacated.

20 Claims, 3 Drawing Sheets

(56) References Cited

U.S. PATENT DOCUMENTS

| | | | |
|---|---|---|---|
| 2009/0204258 A1 | 8/2009 | Tao et al. | |
| 2011/0066282 A1 | 3/2011 | Bosscher et al. | |
| 2012/0215351 A1* | 8/2012 | McGee | B25J 9/1666 700/248 |
| 2013/0110288 A1 | 5/2013 | Cassano et al. | |
| 2017/0097631 A1* | 4/2017 | Linnell | B25J 9/1656 |

FOREIGN PATENT DOCUMENTS

| | | |
|---|---|---|
| DE | 10324627 | 1/2005 |
| DE | 102010007025 | 8/2011 |
| EP | 2586574 | 5/2013 |
| JP | 2009178835 | 8/2009 |

OTHER PUBLICATIONS

The European Search Report from EPO in related European Appl. No. 15191202.9, dated Apr. 13, 2016.
Examination Report from GPTO in DE Appl. No. 10 2014 222 857.3, dated Aug. 26, 2015.
The English translation of the Korean Office Action, dated Sep. 28, 2017, in the related Korean Patent Appl. No. 10-2015-0156714.

* cited by examiner

FLEXIBLE CYCLE TIME-OPTIMIZED SHARING OF A WORKING SPACE FOR ROBOTS

This application claims the benefit of priority under 35 § 119(a) to German Patent Application No. 10 2014 222 857.3, filed on Nov. 10, 2014.

1. TECHNICAL FIELD

The present invention relates generally to a method for controlling a manipulator, which shares a working space with at least one other manipulator, and, in particular, wherein the working space is not used simultaneously by the manipulators.

2. TECHNICAL BACKGROUND

Manipulators, in particular industrial robots, are used for various work processes in, for example, assembly or production in industrial environments. Industrial robots are automatically controlled machines equipped with three or more freely programmable movement axes, which are equipped with appropriate tools for the automatic manipulation of objects.

The use of several manipulators, for example, robots, which share the same working space (or workplace, working range), can increase productivity. However, a working space should not be used by several manipulators at the same time, as this can lead to collisions. For this reason, a manipulator or its controller checks, usually before it enters into a defined common working space, at the limit of the working space, that the working space is not occupied and is thus vacant. If the working space is not vacant, the manipulator conventionally decelerates directly before reaching the working space limit. Only when the working space is vacated, does the manipulator accelerate again and enter into the working space. This method has certain disadvantages, in particular, it leads to undesired manipulator down time. In addition, the deceleration and acceleration consumes additional energy and increases the stress on the manipulator.

In the patent document US 2009/0204258 A1 published in the English language on Aug. 13, 2009 and hereby incorporated by reference in its entirety herein, a system and a method are described to control a plurality of robots on a rail. To prevent the robots from colliding, it is proposed to monitor dynamic spaces of the robots, and to halt a robot in the event of overlap of these spaces.

Furthermore, the patent document US 2013/0110288 A1 published in the English language on May 2, 2013 and hereby incorporated by reference in its entirety herein, proposes modelling the working space of every robot, and defining one or more interference areas. The interference areas should be classified either as "prohibited", "monitored" or "hybrid". The status of a hybrid interference area is dynamically toggled for each robot between "prohibited" and "monitored", depending on whether the hybrid area is free of other robots.

The U.S. Pat. No. 7,765,031 B2, published in the English language on Jul. 27, 2010 and hereby incorporated by reference in its entirety herein, relates to a method for avoiding an interference between a plurality of robots in an overlapping section between occupation zones of a plurality of robots. Furthermore, the patent specification describes a robot which is able to avoid an interference with another robot in an overlapping section between the occupation zones of the robot and of the other robot.

It is thus known from the prior art to identify working space violations and, if necessary, to stop the movement of a manipulator, in order to avoid collisions.

In view of the above-explained prior art, the objective of the present invention is to provide a method and a system which permits better use of a working space by several manipulators, and thereby eliminates or minimizes the above-mentioned disadvantages. The objective is achieved with the method according to claim 1 and the manipulator system according to claim 10.

3. CONTENT OF THE INVENTION

The method according to the invention for controlling a manipulator, in particular a robot such as an industrial robot, for instance, in particular permits an efficient sharing of a working space with at least a second manipulator. In principle, the method according to the invention can be used when a plurality of manipulators are to non-simultaneously share a working space. For the sake of simplicity, the following is based on the case of a working space which is shared by two manipulators not at the same time (non-simultaneously), i.e. the working space may always only be used by one of the two manipulators at any given time. A first manipulator is initially located outside of the working space, while a second manipulator first uses the working space or is located in the working space and thus occupies it. The two manipulators each have prespecified, defined movement profiles (movement patterns or movement sequences).

According to the method, real-time information about the actual status of the movement profile of the second manipulator is supplied while this second manipulator is located in the working space. This real-time information preferably comprises the position and the speed of the second manipulator. However, the real-time information can also contain, for example, data about forces and/or acceleration. It is particularly advantageous that the real-time information is supplied in real time, in other words, in a clock-synchronous manner.

In another step, there is determination, based on the supplied real-time information and the prespecified movement profile of the second manipulator, of the residual period which the second manipulator requires in order to move out of the working space. In other words, the residual period specifies the time period during which the working space remains occupied by the second manipulator. This residual period can preferably contain the number of system cycles during which the second manipulator will remain in the working space.

In a subsequent step, the movement profile of the first manipulator, which is located outside of the working space, is adjusted in response to the determined residual period. The movement profile is adjusted such that the first manipulator adjusts its movement into the working space in such a way that halting of the first manipulator in front of the working space is avoided. The remaining residence period of the second manipulator in the working space is thus responded to, so that the first manipulator enters into the working space at the earliest after expiry of the residual period, and does not halt at the limit of the working space beforehand and wait for it to be vacated. This permits a cycle time-optimized adjustment of the speed profile of the first manipulator. As the result of such an optimization of the cycle times, the efficiency of the collaboration of several manipulators is improved.

Generally preferably, the adjustment of the movement profile of the first manipulator comprises a reduction of the speed, and/or a travel on a deceleration trajectory or an increase of the speed. Preferably, the first manipulator moves steadily without abruptly stopping or abruptly accelerating and reaches the working space at an optimal speed, when this working space is vacated. Such an adjustment of the movement profile of the first manipulator, dependent on the remaining residence period of the second manipulator located in the working space, saves on energy and materials, as a deceleration and an acceleration at the working space limit are avoided. Travel on a deceleration trajectory means that the manipulator travels a detour, so as to arrive at the working space at a later point in time than was planned in the original movement profile. For example, the manipulator does not travel in a direct line to the working space, but instead travels in an arc. It is thus possible to reduce or avoid undesirable deceleration operations.

The adjustment of the movement profile is preferably based on the prespecified movement profile of the manipulator and comprises carrying out at least one other work step outside of the occupied working space. This means that the manipulator continues working on the basis of its prespecified movement profile, in that it carries out, e.g., certain work tasks or work sequences, which are pre-programmed into its movement profile. Thus a work step, for example, which, according to the prespecified movement profile, is to be executed at a later point in time outside of the working space in question by the first manipulator, can be advantageously brought forward. This also prevents the first manipulator from halting at the working space limit and waiting for the working space to be vacated.

The first manipulator preferably increases its speed when the time interval between the first manipulator and the working space limit is greater than the determined residual period. In other words, if the first manipulator requires, according to its current path schedule, a longer period of time in order to reach the working space than the residual period which the second manipulator still requires in order to move out of the working space, the first manipulator increases its speed accordingly, in order to advantageously minimize the time in which the working space is not used.

It is also preferred that the first manipulator reduces its speed and/or travels on a deceleration trajectory, when the time interval between the first manipulator and the working space limit is less than the determined residual period. In other words, if the first manipulator requires, according to its current path schedule, a shorter period of time in order to reach the working space than the residual period which the second manipulator still requires in order to move out of the working space, the first manipulator reduces its speed accordingly and/or travels on a deceleration trajectory (i.e. a detour, for example). Alternatively or in addition, the first manipulator can also execute at least one other work step outside of the occupied working space. This ensures that the first manipulator enters into the working space in a continuous movement, once the second manipulator has moved out of it, without the first manipulator halting at the working space limit. By comparison with the methods which are known from the prior art, such adjustment of the speed profile achieves optimal utilization of the manipulators and lower energy consumption is also preferably achieved, and material fatigue is reduced.

The first manipulator and the second manipulator preferably each have independent controllers. Preferably, the second manipulator, which is located in the working space, supplies the real-time information and/or the determined residual period to the first manipulator, which is located outside of the working space, only when at least one previously defined requirement has been satisfied. This ensures that the second manipulator does not continually supply the data to the first manipulator, but rather does so only at a determined point in time. In this way, the total data volume transferred is significantly reduced. Because less data is supplied, the workload of the first manipulator is also reduced, since it has less data to analyze.

The previously defined requirement preferably involves falling short of a previously defined residual period, which the second manipulator requires in order to move out of the working space. It is also preferable that the previously defined requirement involves falling short of a previously defined spatial distance between the second manipulator and the working space limit. It can thus be stated that the second manipulator supplies the real-time information and/or the determined residual period to the first manipulator only when it has reached a certain spatial and/or time distance from the working space limit.

The manipulator system according to the invention, comprising two manipulators, in particular industrial robots, which non-simultaneously share a working space, is equipped with a control device, which is configured to execute the method according to the invention, so as to be able to implement the described steps of the method.

4. EXEMPLARY EMBODIMENTS

The invention is explained in greater detail below with reference to the accompanying figures, in which.

Figure 3A:
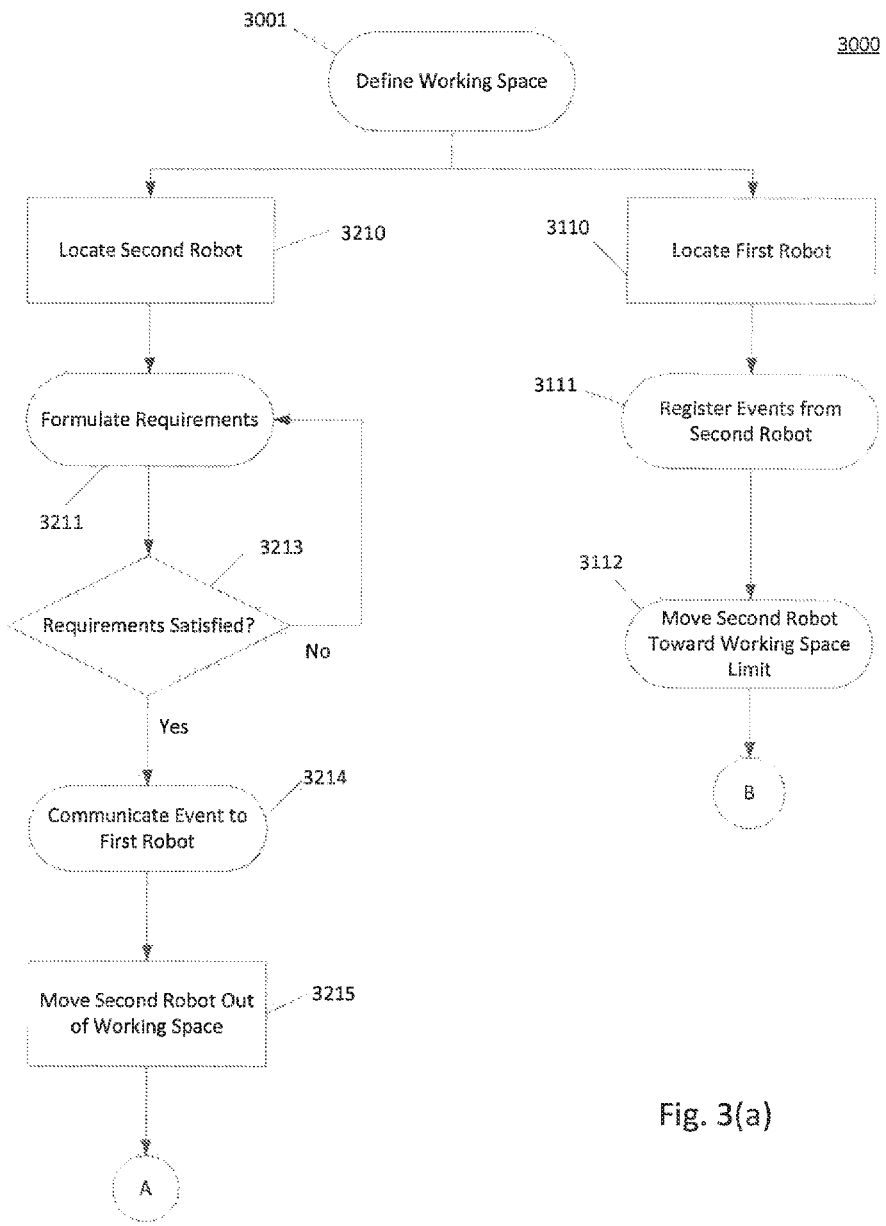

FIGs. 3(a) and (b) together illustrate a flowchart, which depicts, in a schematic and exemplary manner, the sequence of the method according to the invention.

Figure 1:
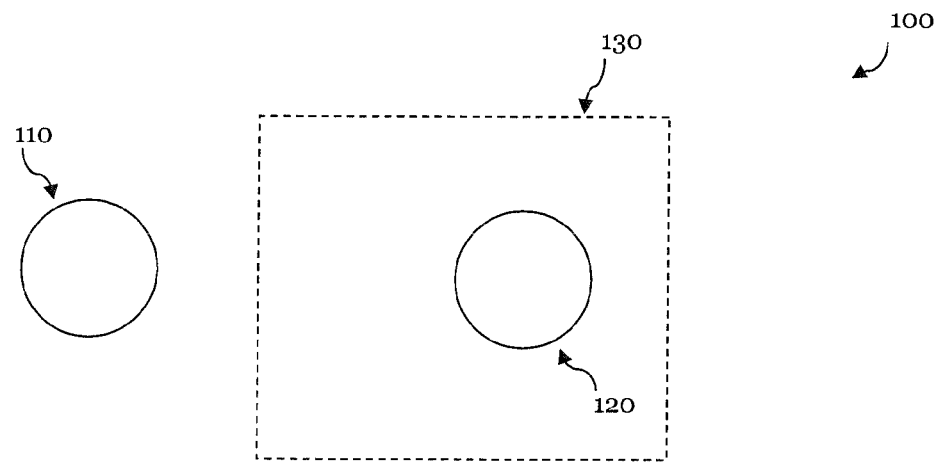
FIG. 1 shows a robot cell with two robots in a purely schematic sketch.

FIG. 1 shows a robot cell 100 having two collaborating manipulators, namely, two robots 110, 120. These robots 110, 120 are preferably industrial robots, which are mobile and which enter into working spaces and can move out of them again. The robots 110, 120 are controlled by means of appropriate control devices. According to the invention, the robots 110, 120 can each have independent controllers or they can have a common controller. Also identified is a working space 130, which is non-simultaneously shared by both robots. In other words, robot 110 can use the working space 130 only when robot 120 has moved out of it. If robot 110 were to enter into the working space 130 before robot 120 has left it, the risk of collision would be increased. For this reason, the working space 130 should only be occupied by a maximum of one robot, so as to avoid possible collision. It is thus possible for robot 110 for example to check at the limit of the working space 130, whether this working space is vacant. If this is the case, then the robot 110 can enter into the working space 130. If, however, robot 120 is in the working space 130, or is working therein, robot 110 receives in response to its check a signal that the working space 130 is occupied. Robot 110 must therefore wait, until robot 120 has moved out of the range 130 and thus vacates it.

Figure 2:
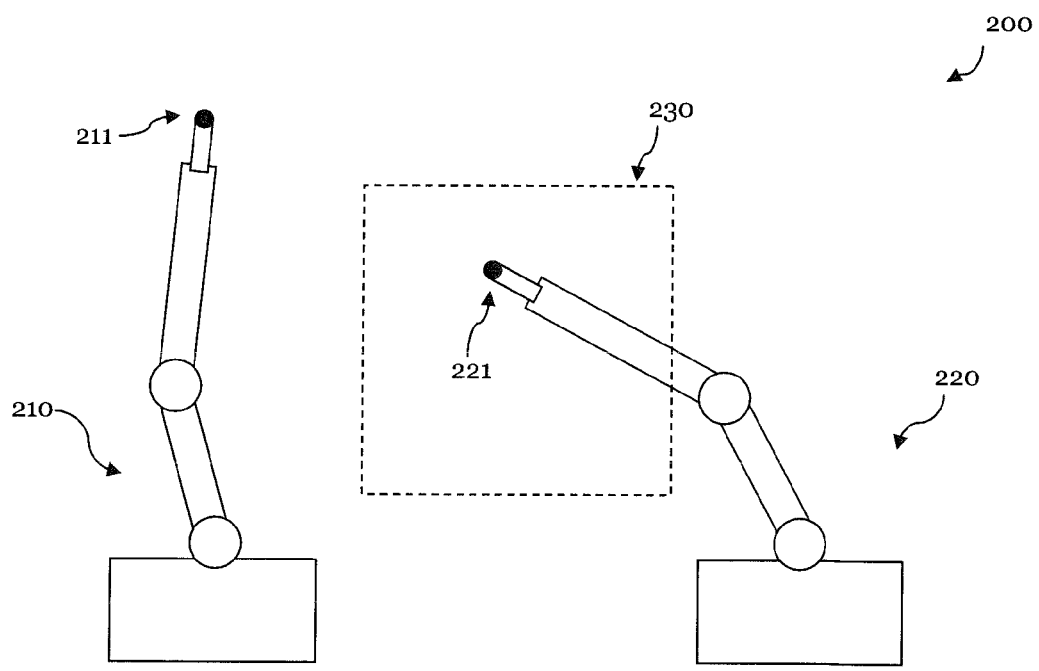
FIG. 2 shows another robot cell with two robots.

FIG. 2 likewise shows a robot cell 200, which has a working space 230, which is used non-simultaneously by two robots 210, 220. The two robots 210, 220 are installed in a stationary manner, however they can reach into the working space 230 by means of their robot arms. In a similar way to the above-described situation, here, robot 210 can move its Tool Center Point (TCP) 211 into the working space 230 only when the TCP 221 of the robot 220 is moved out of this working space. The person skilled in the art will understand that the robot 210 enters into the working space 230 only when robot 220 has completely moved out of it.

The present invention allows the robot 110, 210, which is located outside of the working space 130, 230 and wants to use same, to react to the current status of the other robot 120, 220, which is located inside the working space 130, 230. The robots no, 120, 210, 220 have prespecified movement profiles, which allow anticipatory cooperation between several robots. Through the supply of one or several items of real-time information, and the determination of the residual period until an occupied working space is vacated, the working space 130, 230 can be shared in a cycle time-optimized manner. Thus it is possible, for example, for the robot no, 210 to reach the working space at optimal speed, as soon as this working space is vacated.

Figure 3B:
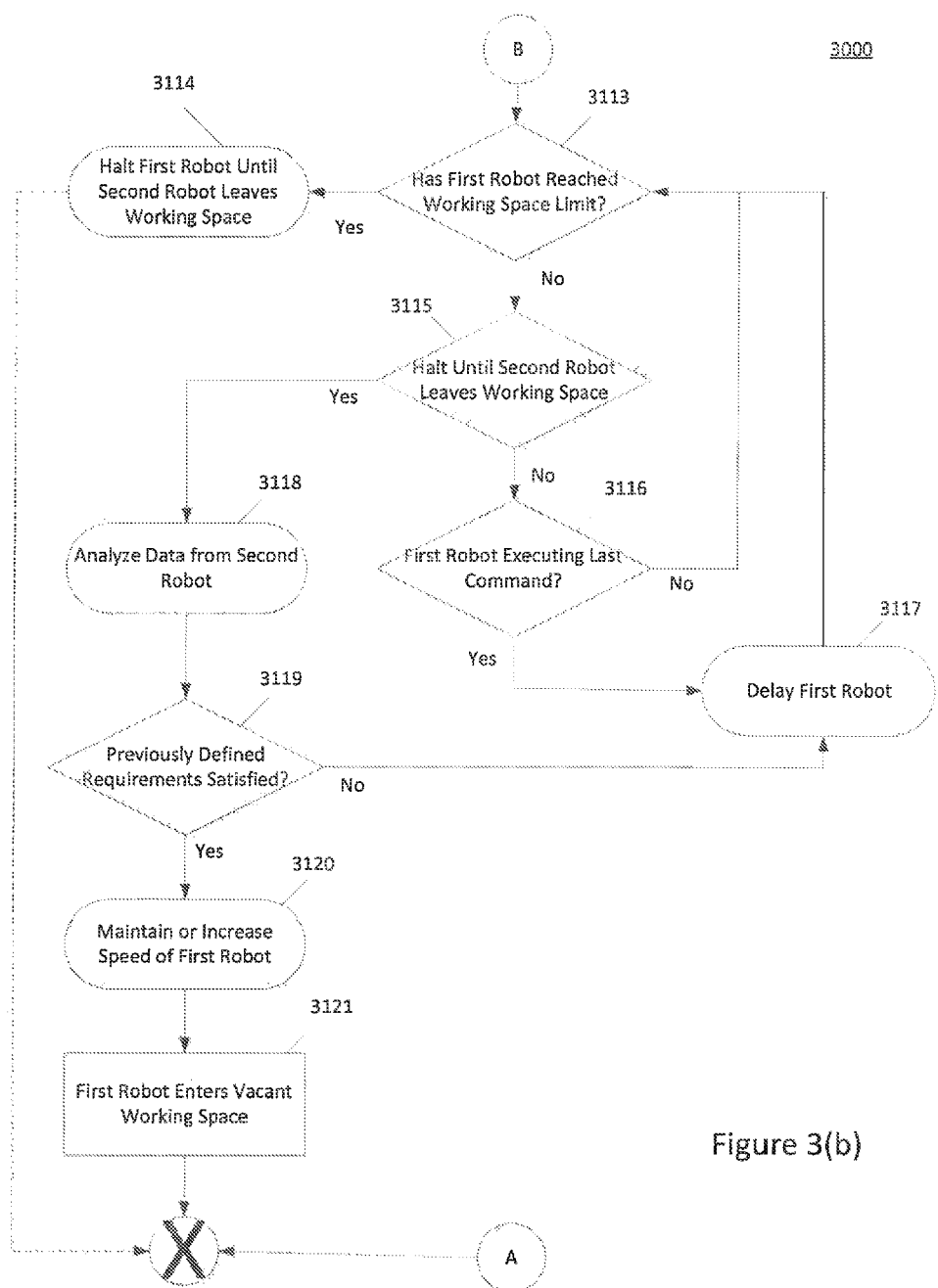

FIG. shows FIGs. 3(a) and 3(b) together illustrate a flowchart for carrying out a method 3000 according to the invention. As illustrated by FIG. 3(a) the method begins in step 3001. In this step 3001, the working space or working range, which is not to be used simultaneously by several robots, is defined. The working space can have various forms, such as a Cartesian, cylindrical, or spherical form, for example.

At the outset, a first robot is located outside of the defined working range in step 3110, while a second robot is located inside the working space in step 3210. The starting position is thus similar, for example, to the situations depicted in FIG. 1 or FIG. 2, and can also be applied to these or to similar situations.

One module of the controller of the second robot can formulate requirements in step 3211, such as falling short of a time interval for the second robot to reach the working space limit, for example. The person skilled in the art will understand that any number of requirements logically linked to one another can be formulated. In step 3212, the second robot moves toward the working space limit, in order to move out of the working space.

In decision 3213, it is determined whether the requirement formulated in step 3211 has been satisfied. If this requirement has been satisfied, in step 3214 an event is communicated in real time to the first robot. This event can comprise, for example, real-time information about the actual status of the second robot. Alternatively or in addition, the event can also involve the residual period in which the second robot is still occupying the working space. In this case, the second robot determines the residual period based on the real-time information about the actual status of its movement profile. It is then possible for the second robot to communicate to the first robot, for example, the number of system cycles during which the second robot (according to the path schedule) will still remain in the working space. The second robot then moves out of the working space in step 3215.

The person skilled in the art will understand that the real-time information about the actual status of the movement profile can contain various data. The real-time information can thus include, for example, the position and speed of the robot, or of the TCP of a robot. Alternatively, this real-time information can also include data about forces, torques and/or accelerations. The real-time information does, in all cases, include such information as allows the determination, in combination with the pre-specified movement profile, of the residual period which a robot requires in order to move out of a working space.

The first robot, which is located outside of the working space at the point in time 3110, registers into events from the second robot in step 3111. It can thus advantageously be stated that the first robot should receive events from the second robot only from the time of this registering.

In step 3112, the first robot approaches the working space. With reference to FIG. 3(a), in the decision 3113 it is checked whether the first robot has already reached the working space limit. If this is the case, and if the working space is not vacant, the first robot halts in step 3114 and waits until the second robot is located outside of the working space, and this working space is thus vacant. This is a precautionary measure and should not occur in normal situations, as halting of the first robot in normal situations is prevented according to the invention. This is indicated in FIG. 3(b) by the dashed line.

If the first robot has not yet reached the working space limit, in step 3115 it is checked whether an event was received by the second robot. If no event was received by the second robot, in step 3116 it is checked whether the first robot is executing the last command to enter into or to approach the working space. If this is the case, and the second robot still has not received an event, a delay strategy is applied to the first robot in step 3117. A delay strategy can involve one or more of the following actions: halting, continued travel with reduced speed, travel on a deceleration trajectory, or carrying out at least one other work step outside of the working space.

If, however, it has been determined in step 3115 that an event was received by the second robot, the data supplied by the second robot is analyzed in step 3118. If, for example, real-time information about the actual status of the second robot was supplied, it is possible to determine, based on this information and the prespecified movement profile of the second robot, the residual period during which the second robot is still occupying the working space. Alternatively, the residual period can also have been determined by the second robot and communicated to the first robot.

In step 3119 it is determined whether one or more previously defined requirements have been satisfied. Such a requirement could, for example, include that the time interval between the second robot and the working space limit, or the residual period which the second robot requires in order to move out of the working space, is less than the time interval between the first robot and the working space limit. If this is not the case, a delay strategy, as described above, is applied to the first robot in step 3117. This allows the first robot to not reach the working space limit too early and means that it does not have to halt and wait there.

Otherwise, if it was determined in step 3119 that the residual period of the second robot is less than the time interval between the first robot and the working space limit, the speed of the first robot is maintained or preferably increased in step 3120. This ensures that the first robot advantageously reaches the working space limit at precisely the time when the working space is vacated. Alternatively, the first robot can also reach the working space limit shortly after the vacation of the working space. The period of time during which the working space is unused or vacant is thus minimized. Finally, the first robot enters the vacant working space in step 3121.

The person skilled in the art will understand that not all of the steps of the method 3000 must be carried out in order to allow a cycle time-optimized sharing of a working space as per the present invention. Alternatively, one or more steps can also be added. Thus the disclosed method can, for example, also include the first robot decelerating at the working space limit and waiting for the working space to be vacated, if the second robot remains, contrary to the schedule, in the working space. As another variant, the second robot can send an additional event to the first robot, when the second robot has definitely moved out of the working space. Furthermore, the method 3000 can, on the other hand, also be expanded to stipulate that more than two robots can share the working space in a non-simultaneous and cycle time-optimized manner. It should be noted that the invention claimed herein is not limited to the described embodiments, but may be otherwise variously embodied within the scope of the claims listed infra.

REFERENCE NUMERALS LIST 110, 120, 210, 220 Robots
130, 230 Working spaces

The invention claimed is:

1. A method for controlling a first manipulator, which non-simultaneously shares a working space with at least a second manipulator, wherein the first and second manipulators each have prespecified movement profiles, which method includes the following steps:
   a) supplying real-time information about the actual status of the movement profile of the second manipulator, while it is in the working space;
   b) determining, based on the supplied real-time information and the prespecified movement profile of the second manipulator, a residual period of time which the second manipulator requires in order to move out of the working space;
   c) adapting the movement profile of the first manipulator as a response to the residual period determined in step b), so that the first manipulator adjusts its movement toward a boundary of the working space in such a way that halting of the first manipulator in front of the working space is avoided.

2. The method according to claim 1, wherein the real-time information comprises at least one of a position, speed, force or torque.

3. The method according to claim 1, wherein the adjustment of the movement profile of the first manipulator comprises at least one of a reduction of a speed of the first manipulator, a travel on a deceleration trajectory or an increase of the speed of the first manipulator.

4. The method according to claim 1, wherein the adjustment of the movement profile is based on the prespecified movement profile and comprises execution of a work step outside of the working space.

5. The method according to claim 1, wherein the first manipulator increases its speed when a time interval for the first manipulator to reach the working space boundary is greater than the determined residual period.

6. The method according to claim 1, wherein the first manipulator performs at least one of reducing its speed or traveling on a deceleration trajectory when a time interval the first manipulator to reach the working space boundary is less than the determined residual period.

7. The method according to claim 1, wherein the first manipulator and the second manipulator each have independent controllers and the second manipulator supplies at least one of the real-time information or the determined residual period to the first manipulator only when at least one previously defined requirement has been satisfied.

8. The method according to claim 7, wherein the previously defined requirement involves at least one of falling short of a previously defined residual period, which the second manipulator requires in order to move out of the working space, or falling short of a previously defined spatial distance between the second manipulator and the working space boundary.

9. The method according to claim 1, wherein the residual period is defined by a number of system cycles during which the second manipulator will remain in the working space.

10. The method according to claim 1, wherein the first manipulator comprises a first robot and the second manipulator comprises a second robot.

11. A manipulator system, comprising:
   two manipulators which non-simultaneously share a working space, and
   a control device,
   wherein the control device is configured to:
      a) supply real-time information about the actual status of a prespecified movement profile of the second manipulator, while it is in the working space;
      b) determine, based on the supplied real-time information and the prespecified movement profile of the second manipulator, a residual period of time which the second manipulator requires in order to move out of the working space; and
      c) adapt a movement profile of the first manipulator as a response to the residual period determined in step b), so that the first manipulator adjusts its movement toward a boundary of the working space in such a way that halting of the first manipulator in front of the working space is avoided.

12. The system according to claim 11, wherein the real-time information comprises at least one of a position, speed, force or torque.

13. The system according to claim 11, Wherein the adjustment of the movement profile of the first manipulator comprises at least one of a reduction of a speed of the first manipulator, a travel on a deceleration trajectory or an increase of the speed of the first manipulator.

14. The system according to claim 11, wherein the adjustment of the movement profile is based on the prespecified movement profile and comprises execution of a work step outside of the working space.

15. The system according to claim 11, wherein the first manipulator increases its speed when a time interval for between the first manipulator to reach and the working space boundary limit is greater than the determined residual period.

16. The system according to claim 11, wherein the first manipulator performs at least one of reducing its speed or traveling on a deceleration trajectory when a time interval between the first manipulator to reach and the working space boundary limit is less than the determined residual period.

17. The system according to claim 11, wherein the first manipulator and the second manipulator each have independent controllers and the second manipulator supplies at least one of the real-time information or and/or the determined residual period to the first manipulator only when at least one previously defined requirement has been satisfied.

18. The system according to claim 11, wherein the previously defined requirement involves at least one of falling short of a previously defined residual period, which the second manipulator requires in order to move out of the working space, or tiling short of a previously defined spatial distance between the second manipulator and the working space boundary limit.

19. The system according to claim 11, wherein the residual period is defined by a number of system cycles during which the second manipulator will remain in the working space.

20. The system according to claim 11, wherein the first manipulator comprises a first robot and the second manipulator comprises a second robot.

* * * * *